Feb. 5, 1952 W. D. THOMPSON 2,584,373
MULTIPLE ROLL FILM CAMERA
Filed Aug. 4, 1947 2 SHEETS—SHEET 1

INVENTOR.
WILLIAM D. THOMPSON
BY Lyon & Lyon
attorneys

Feb. 5, 1952 W. D. THOMPSON 2,584,373
MULTIPLE ROLL FILM CAMERA
Filed Aug. 4, 1947 2 SHEETS—SHEET 2
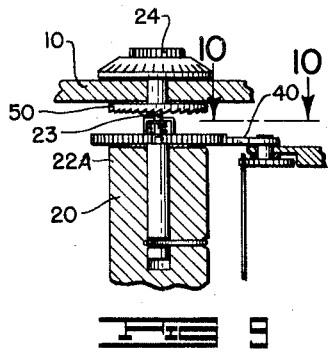
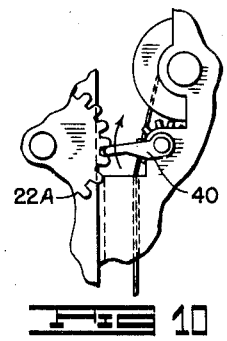
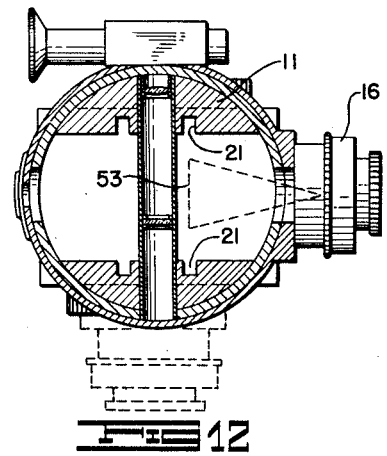
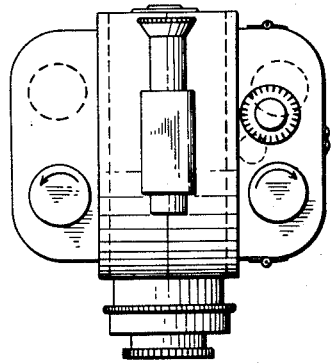
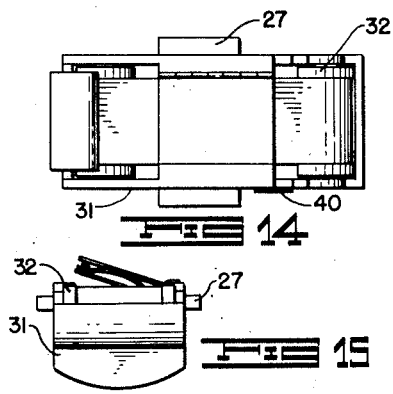
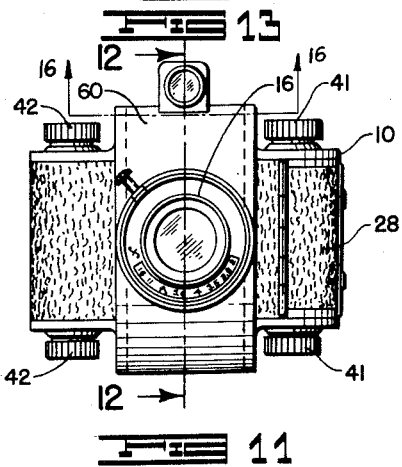
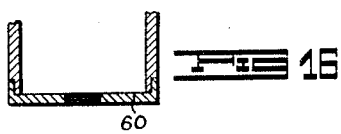
INVENTOR.
WILLIAM D. THOMPSON
BY Lyon & Lyon
attorneys Patented Feb. 5, 1952

2,584,373

UNITED STATES PATENT OFFICE 2,584,373

MULTIPLE ROLL FILM CAMERA

William D. Thompson, San Diego, Calif.

Application August 4, 1947, Serial No. 765,921

5 Claims. (Cl. 95—31)

The principal invention relates generally to a camera which may utilize one or a plurality of films arranged for selective exposure, and as an example and not as a limitation to two film cameras of the type in my United States Patent No. 2,315,284, issued March 30, 1943 on a Multiple Film Carrying Camera.

While certain features of the present invention are specifically related to two film cameras of the type shown herein, other features of the present invention may be present in cameras which are arranged to expose but one film.

An object of the present invention is to provide an improved camera characterized by its simplicity and ease of manufacture and of the type in which a lens system may be selectively positioned for projecting scenes onto either one or two film strips having their planes in back-to-back relationship but separated by a light barrier such that the camera may be loaded with, for example, color film and also black and white film and exposures made on either one of these two films according to the desires of the operator.

Still another object of the present invention is to provide an improved roll film camera having a single optical exposure system adapted upon rotation on the camera case for selective exposure of frames of different types of films having their planes disposed in back-to-back relationship and separated by a light barrier.

Yet another object of the present invention is to provide an improved camera of the type specified in the next preceding object but arranged so that the film itself is rotated into position for exposure and the optical exposure system is mounted stationarily on the camera frame.

Yet another object of the present invention is to provide an improved unitary camera in which the film supply spool, the shadow box or exposure frame, a portion the film transport mechanism and the take-up reel are all mounted on a unitary structure insertable and removable as a unit from the camera.

Yet a further object of the present invention is to provide an improved camera having a pair of films with their planes in back-to-back relationship and separated by a light barrier in which a common lens system is arranged for exposure of either film, there being provided, in accordance with important features of the present invention, improved means whereby the film is moved relative to the common lens system without the necessity of detaching at any time, the lens system from the case and the necessity of providing expensive self-closing light type gates which are always subject to mal-function.

For a further determination of the novel features which I have incorporated in cameras of this type, reference is made to my co-pending application Serial No. 762,029, filed July 19, 1947 for Camera with Film Spools at Right Angles to One Another.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 9 is an enlarged sectional view showing, in more detail, structure of the frame counter mechanism.

Figure 10 is a view taken substantially on the line 10—10 of Figure 9.

Figure 11 is a view in front elevation of a modified camera structure embodying the present invention.

Figure 12 is a longitudinal sectional view taken substantially on the line 12—12 of Figure 11, and indicates the manner in which the optical exposure system may be rotated into position on the camera frame.

Figure 13 is a top plan view of the camera shown in Figure 11.

Figures 14 and 15 show side end views respectively of the unit shown in Figure 4.

Figure 16 is a sectional view taken substantially on the line 16—16 of Figure 11.

The two cameras shown herein are unitary compact roll film cameras, each having two individual film compartments which may each contain film of different characteristics with the film arranged in back-to-back relationship and separated by a light barrier for selective exposure by a single lens system which, in accordance with novel features of the present invention, may be moved with respect to the film or the film moved with respect to the lens system into proper position for exposing either film.

Figure 2:
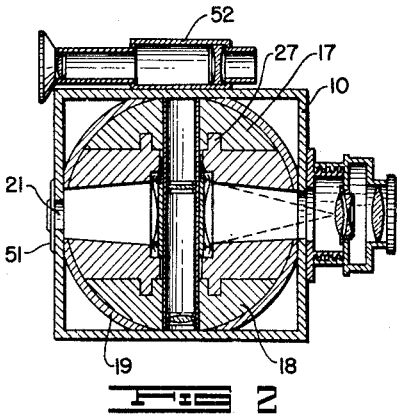
Figure 2 is a sectional view taken substantially on the line 2—2 of Figure 1.
Figure 1:
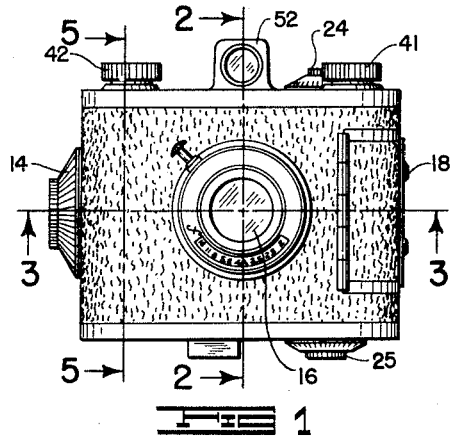
Figure 1 is a view in front elevation of a camera embodying the present invention.

Preferably, the camera incorporates therein a focusing tube arranged with its axis substantially parallel to the film planes to aid in properly focusing the optical system. Referring more particularly to the camera shown in Figures 1 through 10 inclusive, the camera has a frame or case 10 in which there is a rotatable rotor element 11. This rotor element 11 is mounted in spaced light-tight bearings 12 and 13 at opposite ends of case 10 with a knob 14 on the rotor shaft 15 to position the rotor 11 with respect to the conventional type of optical exposure system 16 mounted on the front face of the camera. The constructional details of the rotor element 11 are rather important and are described now in detail. Referring to Figures 6 and 7, the rotor 11 shown therein comprises a pair of arcuate bearing members 17, 18 arranged to slide within the circular housing member 19 (Figure 2) on the camera frame 10, a rectangular member 20 joining the arcuate members 17, 18 and serving, as will be evident later, as a light barrier. The member 20 has extending therethrough a focusing tube 21 which may be axially aligned with the optical exposure system 16 and the aperture 21 in the rear face of the camera frame 10. The arcuate shaped members 17, 18 each have a longitudinally extending groove 21 therein, arranged to maintain in quickly attachable and detachable engagement the negative film carrier 22 which is described in detail later. Also, the rectangular member 20 has rotatably mounted thereon a ratchet wheel 22A carrying on its upper face a spring biased pawl member 23 for moving either one of the frame counters 24, 25.

When the rotor 11 is mounted in the camera frame 10, the rectangular joining member 20 serves to divide the interior of the case 10 into two separate chambers 25, 26. The position of these chambers 25, 26 changes, of course, when and as the rotor 11 is rotated. Two negative film carrier mechanisms 22 are mounted on opposite sides of the light barrier 20 with the projections 27 thereon slidably mounted in the grooves 21. Either one of these negative film carriers 22 may be inserted and removed from film taking position in the camera case 10 by simply opening the corresponding hinged door members 28, 29 on case 10 and then sliding the negative carrier 22 with respect to the rotor.

Each negative carrier is a unitary structure comprising suitable film supply reel holding structure 30, shadow box 31, film take-up mechanism 32, rotatable sprocket wheel 33 and a spring pressed pressure plate 34 arranged to engage and resiliently press the perforated edges of film tautly against the edges of the shadow box. When the carrier 22 is inserted in operative position on the rotor 11, the outside surface of the pressure plate 34 bears against the light partition member 20 to press spring members into engagement with the edges of the shadow box. Thus, film in its passage from the supply reel 30 passes over the shadow box 31 over the sprocket wheel 33 to rotate it with its attached pawl member 40 and is then wound on the take-up reeel 32.

Figure 5:
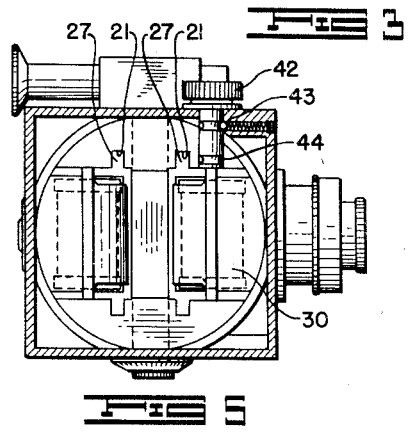
Figure 5 is a sectional view taken substantially on the line 5—5 of Figure 1.
Figures 6, 7:
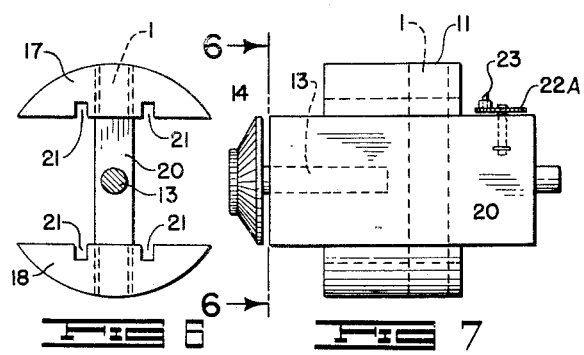
Figure 6 is a sectional view taken substantially on the line 6—6 of Figure 7.
Figure 7 is a view in side elevation of the rotor upon which the negative carrier is mounted in the camera shown in Figure 1.

The take-up reel 32 may be rotated by the take-up knob 41 to produce this motion of film from the supply 30 to the take-up reel 32 and may be selectively placed into engagement with the take-up reel for this purpose when mounted in accordance with the structure shown in Figure 5. In other words, the film take-up knob 41 may be moved into engagement with the take-up reel 32 to rotate it in exactly the same manner as does the film rewind member 42 engage the film supply reel 30. The manually operable film rewind member 42 is mounted for rotation on the camera case 10 with its inner end movable into position to engage the reel 30 to rotate it when desired and may be held in such position by the spring detent means 43. When it is desired to rotate rotor 11 with the film carriers 22 mounted thereon, the manually operable control members 41 and 42 are raised to a position corresponding to the position wherein the spring biased ball forming a part of the detent means 43 engages the bottom groove 44, in which case rotational movement of the rotor 11 is not impaired by members 41 and 42. When the film is being transported from the film supply reel 30 to the film take-up reel 32 or vice versa, the sprocket wheel 33 is rotated as well as the pawl member 40. The pawl member 40 serves to rotate the frame counter 24, 25 depending upon the angle or position of the rotor 11. When the rotor 11 is rotated for exposure of either one of the two films, the pawl member 40 is brought into cooperative relationship with the ratchet wheel 22A rotatably mounted on the light partition 20 to cause it to move the spring biased pawl 23 angularly. This spring biased pawl member 23 cooperates with its ratchet member 50 on the same shaft as is the frame counter 24.

In operation of the camera shown in Figures 1 through 10 inclusive, the film is loaded on a negative carrier 22 with the leader of the film passing over the sprocket wheel 33 and onto the take-up reel 32. The loaded film carrier 22 is then inserted through the open door 28 or 29 as the case may be into holding engagement on the rotor 11. The doors 28 and 29 are then closed and the knob 14 rotated to bring the desired film into position for exposure by the optical exposure system 16. It is apparent that the knob 14 must be rotated one-half a revolution in order to position a different film for exposure. When it is desired to focus the optical exposure system 16, the knob 14 is rotated 90 degrees from its position corresponding to picture taking position, in which case the focusing tube 10 is brought into alignment with the optical exposure system 16 and the normally covered aperture 21 on the back face of the camera. This aperture 21 is, of course, normally closed by a quickly positionable closure member 51 of conventional type.

Of course, when the knob 14 is thus rotated to position this film or to align the focusing tube, the knobs 41 and 42 must be pulled upwardly to their retracted positions out of engagement with the film supply reel and film take-up reel.

If desired, the camera may be provided with a view finder 52 mounted on its upper horizontal face.

It is further apparent that the manual control knobs 41, 42 may serve as indexing means for the rotor 11 or, if desired, conventional spring biased detent means of conventional type may be interposed between the knob 14 and the adjacent face of the camera case 10.

In the modified camera structure shown in Figures 11 through 13 inclusive, the single optical exposure system 16 is rotated instead of the film. Otherwise, the operational features and certain constructional features are identical in both cameras shown herein and for that reason corresponding parts have identical reference numerals.

Figures 3, 4:
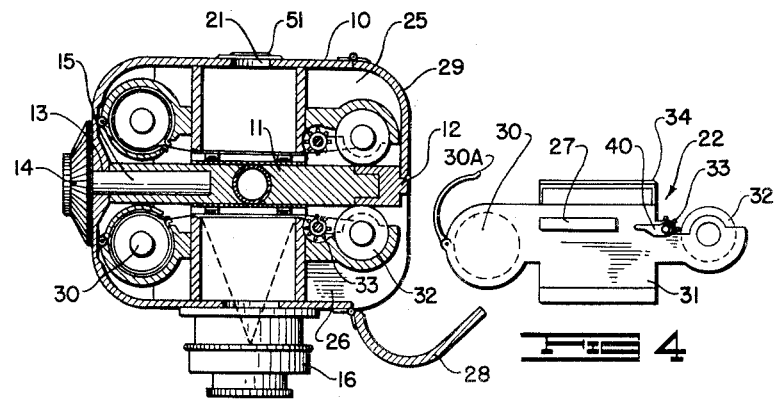
Figure 3 is a sectional view taken substantially on the line 3—3 of Figure 1.
Figure 4 is a view in top plan elevation of a portion of the camera shown in Figure 3 withdrawn from the camera case.

In Figures 11 through 13, the optical exposure system 16 is mounted on the drum-shaped housing member 60 which is rotatably mounted on the camera case 10, while the film carrier is stationarily mounted with the frame 10 in sliding engagement in grooves 21 in the stationary member 11. For the sake of simplicity, the negative carriers of identical structure shown in Figure 4 is omitted from Figure 12, but the position of the film is indicated by the dotted line 53 corresponding to the focal plane of the optical exposure system 16.

In operation of the camera shown in Figures 11 through 13, film is loaded in the negative carrier 22 as described above and the film carrier is moved as a unit into the camera through the open doors 28, 29. The optical exposure system 16 is then rotated on the frame 10 into position to expose the desired film. If exposure of the other film is desired, it is necessary to rotate the exposure system 16 through an angle of 180 degrees and, if it is desired to obtain an image on the ground glass screen in the focusing tube, it is necessary to rotate the optical exposure system 16 through an angle of 90 degrees from a picture taking position, in which case the focusing tube 21 is aligned with the optical exposure system 16 and the aperture 21 which is normally closed by the positionable closure member 51.

Conventional means may be utilized to prevent the drum shaped member 60 from sliding to the right or left in Figures 11 and 13. For example, a guide pin on member 60 may, for this purpose, project into a cooperating annular guide groove in the case 10, or the same purpose may be accomplished by the structure shown in Figure 16 wherein the drum member 60 comprises two halves which are joined together by a press fit pin connection as shown.

While the camera shown in Figures 1 through 10 inclusive requires only one film take-up knob 41 and one rewind knob 42 for both films, it is apparent that in the camera structure shown in Figures 11 through 13 inclusive a pair of such knobs 41, 42 is required for each film.

Figure 8:
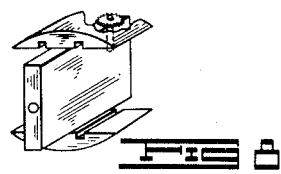
Figure 8 is a perspective view of a portion of the rotor shown in Figure 7 with a part thereof fragmented to show more clearly a portion of the frame counter actuating mechanism.

Referring again to the camera structure shown in Figures 1 through 10, inclusive, the rotor member shown in Figure 8 may be a die casting with elements 20, 17 and 18 integrally formed. It is noted that the member 20 need not provide a completely light tight partition. As a matter of fact, the partition is not light tight since it is necessary that it clears the film winding shafts when the rotor is turned. However, exposure of one film through the optical exposure system does not cause exposure of the other film even though the two compartments are not light tight from each other. This is so since the optical exposure system directs a controlled beam of light that is directed to its focal plane through the shadow box. In such case, an unpredictable amount of light travels around and enters the other shadow box on the other side of the partition.

However, if one or the other of the doors 28, 29 is opened, some light, in such case, could travel over the top of the central partition 20 of the rotor.

If it is deemed advisable to have the camera constructed so that either one of the two negative carriers could be withdrawn from its compartments through its door in the camera case without admitting any light to the other compartment, then the negative carrier itself is made light tight. This may be easily accomplished by covering the film in its travel from the supply spool 30 to the pressure plate and also by covering the film at the other side in its travel from the pressure plate to the take-up spool 32. This cover may be suitably shaped metal parts stamped to form and fitted to the carrier. This stamping, in such case, completely surrounds the take-up spool so that after the film is once loaded, the only portion of the film that may be exposed to light is that portion directly under the pressure plate and facing the lens; all other parts of the film lying under being protected from light by the stamping described above. In such case, if all of the film in one of the camera compartments is used before the film in the other compartment, the door of the first mentioned compartment may be opened and the negative carrier therein withdrawn for reloading without any light reaching the film in the other compartment. In such case access may be had to the film on the supply reel 30 through the hinged member 30A which normally maintains the supply spool in place, which of course overlaps the negative carrier frame at the top and bottom and in the modified light tight structure also slightly overlaps the above mentioned metal cover stripping to provide a light tight cover. At the other or take-up spool end there may be a hinged member 30A to surround the take-up spool to maintain this end light-tight also. This whole assembly need not be light-tight to such an extent as to protect the film when the carrier is out of the camera since the carrier is normally out only for the purpose of loading or unloading, in which case it need be light tight only to the extent of protecting the film when one or the other of the doors is opened, in which case there is only a minimum amount of light traveling in an angled path, and since it is always advisable to load or unload any camera in subdued light. Usually, instructions for present day cameras stress the importance of loading and unloading film in subdued light and of course, if the user of the camera shown herein is careful to follow this advice, this additional light protection is not necessary but is advisable to cover all conditions.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a camera, the combination of a camera frame, a rotor rotatably mounted within said frame, a plurality of unitary negative carrier structures quickly attachably and detachably mounted on said rotor element, an optical exposure system mounted on said camera frame, and means arranged to rotate said rotor whereby one of said negative film carriers may be moved into cooperative position with respect to said optical exposure system, each one of said plurality of unitary negative carrier structures comprising: a supply spool and a take-up spool mounted on opposite sides of a shadow box on said carrier structure, each of said carrier structures being slidably movable in said rotor element in a direction extending from said supply spool to said take-up spool, and a film take-up knob and a film rewind knob each having their shafts both rotatably and longitudinally movable in said camera frame for movement from a retracted position to a position in operative engagement respectively with said take-up spool and said supply spool, said take-up knob and rewind knob, when in retracted position, allowing rotatable movement of said rotor, and when in engagement respectively with said supply spool and take-up spool preventing rotatable movement of said rotor.

2. A camera adapted for the selective exposure of a plurality of film strips, said camera having separate film compartments for each of said strips, a single optical exposure system stationarily mounted on the camera frame, said film compartments being mounted for rotation on said camera to position said film within said compartments in position for exposure by said stationary single optical exposure system, said separate film compartments each comprising a negative film carrier supporting a supply spool and also a take-up spool on opposite sides of a shadow box, said negative carrier being slidably mounted in a modified barrel-shaped member arranged to rotate within the camera frame about the axis of the barrel, said negative carrier being releasably and slidably mounted in said barrel-shaped member in a direction substantially parallel to the barrel axis and in the direction of the plane of the film fed from the supply spool to the take-up spool, a film take-up knob and a film rewind knob each having their shafts both rotatably and longitudinally movable in said camera frame for movement from a retracted position to a position in operative engagement respectively with said take-up spool and said supply spool, said take-up knob and rewind knob, when in retracted position, allowing rotatable movement of said barrel-shaped member, and when in engagement respectively with said supply spool and take-up spool preventing rotatable movement of said barrel-shaped member.

3. A camera arranged for the selective exposure of a plurality of film strips, said camera having two separate film compartments arranged to support film in back to back relationship with a light barrier therebetween, a single optical exposure system stationarily mounted on the camera frame, said film compartments being rotatably mounted within said camera frame for cooperation with said optical exposure system, said film strips when in position for exposure being substantially equidistant from the center of rotation of said film compartments, said separate film compartments each comprising a negative film carrier supporting a supply spool and also a take-up spool on opposite sides of a shadow box, said negative carrier being slidably mounted in a modified barrel-shaped member arranged to rotate within the camera frame about the axis of the barrel, said negative carrier being releasably and slidably mounted in said barrel-shaped member in a direction substantially parallel to the barrel axis and in the direction of the plane of the film fed from the supply spool to the take-up spool, a film take-up knob and a film rewind knob each having their shafts both rotatably and longitudinally movable in said camera frame for movement from a retracted position to a position in operative engagement respectively with said take-up spool and said supply spool, said take-up knob and rewind knob, when in retracted position, allowing rotatable movement of said barrel-shaped member, and when in engagement respectively with said supply spool and take-up spool preventing rotatable movement of said barrel-shaped member.

4. A camera arranged for the selective exposure of a plurality of film strips, said camera having two separate film compartments arranged to support film in back to back relationship with a light barrier therebetween, a single optical exposure system stationarily mounted on the camera frame, said film compartments being rotatably mounted within said camera frame for cooperation with said optical exposure system, said film strips when in position for exposure being substantially equidistant from the center of rotation of said film compartments, said separate film compartments each comprising a negative film carrier supporting a supply spool and also a take-up spool on opposite sides of a shadow box, said negative carrier being slidably mounted in a modified barrel-shaped member arranged to rotate within the camera frame about the axis of the barrel, said negative carrier being releasably and slidably mounted in said barrel-shaped member in a direction substantially parallel to the barrel axis and in the direction of the plane of the film fed from the supply spool to the take-up spool, a light tube mounted on said film compartments for movement therewith relative to said camera frame, said light tube extending through said light barrier with the axis of said light tube perpendicular to the axis of rotation of said film compartments for movement into aligned position with said optical exposure system.

5. A camera adapted for the selective exposure of a plurality of film strips, said camera having separate film compartments for each of said strips, a single optical exposure system stationarily mounted on the camera frame, said film compartments being mounted for rotation on said camera to position said film within said compartments in position for exposure by said stationary single optical exposure system, said separate film compartments each comprising a negative film carrier supporting a supply spool and also a take-up spool on opposite sides of a shadow box, said negative carrier being slidably mounted in a modified barrel-shaped member arranged to rotate within the camera frame about the axis of the barrel, said negative carrier being releasably and slidably mounted in said barrel-shaped member in a direction substantially parallel to the barrel axis and in the direction of the plane of the film fed from the supply spool to the take-up spool, a light tube mounted on said barrel-shaped member for movement therewith relative to said frame, the axis of said light tube being perpendicular to the axis of the barrel-shaped member, for movement into aligned relationship with said optical exposure system.

WILLIAM D. THOMPSON.

REFERENCES CITED

The following references are of record in the file of this patent:

UNITED STATES PATENTS

| Number | Name | Date |
|---|---|---|
| 904,005 | Niell | Nov. 17, 1908 |
| 1,682,873 | Victor | Sept. 4, 1928 |
| 1,984,420 | Moulin et al. | Dec. 18, 1934 |
| 2,245,606 | Rausch | June 17, 1941 |
| 2,315,284 | Thompson | Mar. 30, 1943 |
| 2,356,284 | Stockdale | Aug. 22, 1944 |
| 2,439,112 | Teague | Apr. 6, 1948 |